(12) United States Patent
Cheng

(10) Patent No.: US 12,505,054 B2
(45) Date of Patent: Dec. 23, 2025

(54) MOBILE DEVICES AND OPERATION METHODS THEREOF, SYSTEMS, AND COMPUTER-READABLE STORAGE MEDIUMS

(71) Applicant: Yangtze Memory Technologies Co., Ltd., Hubei (CN)

(72) Inventor: Mo Cheng, Hubei (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 93 days.

(21) Appl. No.: 18/535,400

(22) Filed: Dec. 11, 2023

(65) Prior Publication Data

US 2025/0094363 A1    Mar. 20, 2025

(30) Foreign Application Priority Data

Sep. 18, 2023   (CN) .......................... 202311212423.5

(51) Int. Cl.
  *G06F 13/16*   (2006.01)
  *G06F 13/40*   (2006.01)

(52) U.S. Cl.
  CPC ...... *G06F 13/1668* (2013.01); *G06F 13/4022* (2013.01); *G06F 13/4027* (2013.01)

(58) Field of Classification Search
  CPC ............. G06F 13/1668; G06F 13/4027; G06F 13/4022
  See application file for complete search history.

(56) References Cited

U.S. PATENT DOCUMENTS

| | | | |
|---|---|---|---|
| 8,150,452 B2 * | 4/2012 | Liang ................ | H04M 1/72409 455/550.1 |
| 9,069,714 B2 * | 6/2015 | Yu ....................... | G06F 13/1694 |
| 9,894,510 B1 * | 2/2018 | Kortunov .......... | H04M 1/72448 |
| 9,972,510 B2 * | 5/2018 | Fujikata .............. | H01L 21/6723 |
| 11,877,842 B1 * | 1/2024 | Filipovic ............. | A61B 3/0033 |
| 2013/0254431 A1 * | 9/2013 | Kuroiwa ................ | G06F 21/31 710/14 |
| 2015/0113356 A1 * | 4/2015 | Ken ..................... | G06F 11/106 711/132 |
| 2017/0126264 A1 * | 5/2017 | Nam .................... | H04B 1/3816 |
| 2017/0374186 A1 * | 12/2017 | Velusamy ............. | G06F 3/065 |
| 2018/0046336 A1 * | 2/2018 | Zhang ................... | G06F 3/0482 |
| 2019/0370456 A1 * | 12/2019 | Abbasian ................ | G06F 21/78 |

* cited by examiner

*Primary Examiner* — Henry Tsai
*Assistant Examiner* — Christopher A Daley
(74) *Attorney, Agent, or Firm* — Hanley, Flight & Zimmerman, LLC

(57) ABSTRACT

Examples of the present disclosure disclose a mobile device and an operation method thereof, a system, and a computer-readable storage medium. The mobile device includes a first memory, a memory system, a switching circuit and an external interface. The switching circuit is configured to: in response to a switching instruction, switch from a first state to a second state or a third state, wherein the switching instruction is to indicate to access the memory system, and wherein in the first state, the first memory is coupled to the external interface via the switching circuit, in the second state, the memory system is coupled to the first memory via the switching circuit, and in the third state, the memory system is coupled to the external interface via the switching circuit.

20 Claims, 6 Drawing Sheets

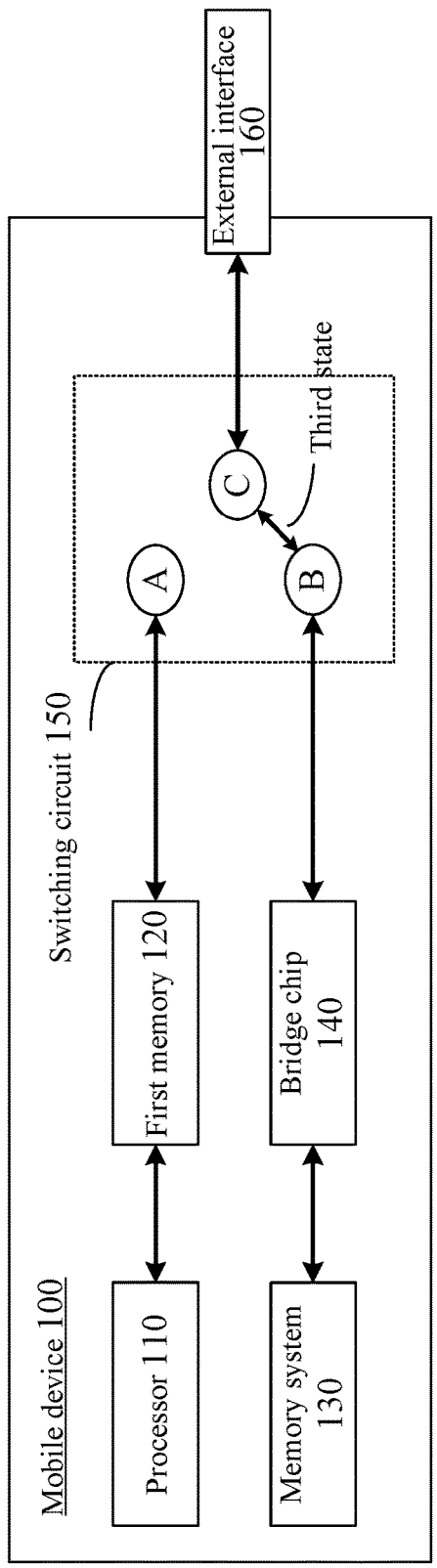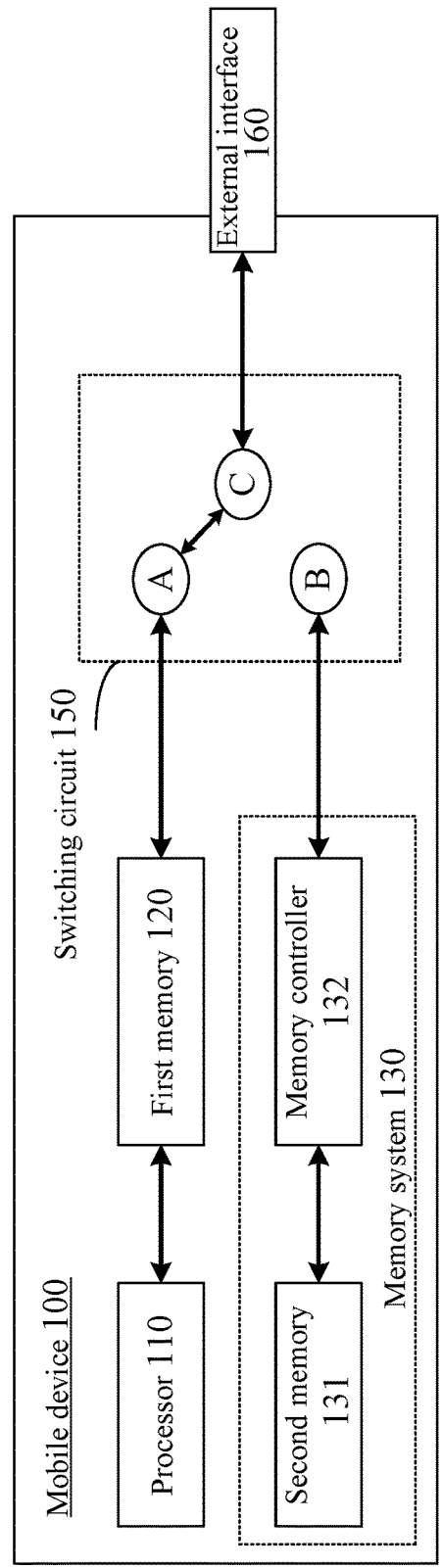

MOBILE DEVICES AND OPERATION METHODS THEREOF, SYSTEMS, AND COMPUTER-READABLE STORAGE MEDIUMS

CROSS REFERENCE TO RELATED APPLICATIONS

This application claims priority to and the benefit of Chinese Patent Application 202311212423.5, filed on Sep. 18, 2023, which is hereby incorporated by reference in its entirety.

TECHNICAL FIELD

Examples of the present disclosure relate to semiconductor technologies, and relate to but are not limited to a mobile device and an operation method thereof, a system, and a computer-readable storage medium.

BACKGROUND

With the development of information technology, mobile devices such as cell phones and tablets are more and more widely used in daily work, study and life. By using small and portable mobile devices, users can not only communicate, but also store data information (for example, audio, video, images, etc.) anytime and anywhere.

BRIEF DESCRIPTION OF THE DRAWINGS

FIG. 3 is a schematic diagram of a mobile device in a third state according to an example of the present disclosure;

FIG. 4 is a schematic diagram of another mobile device according to an example of the present disclosure;

DETAILED DESCRIPTION

Figure 1:
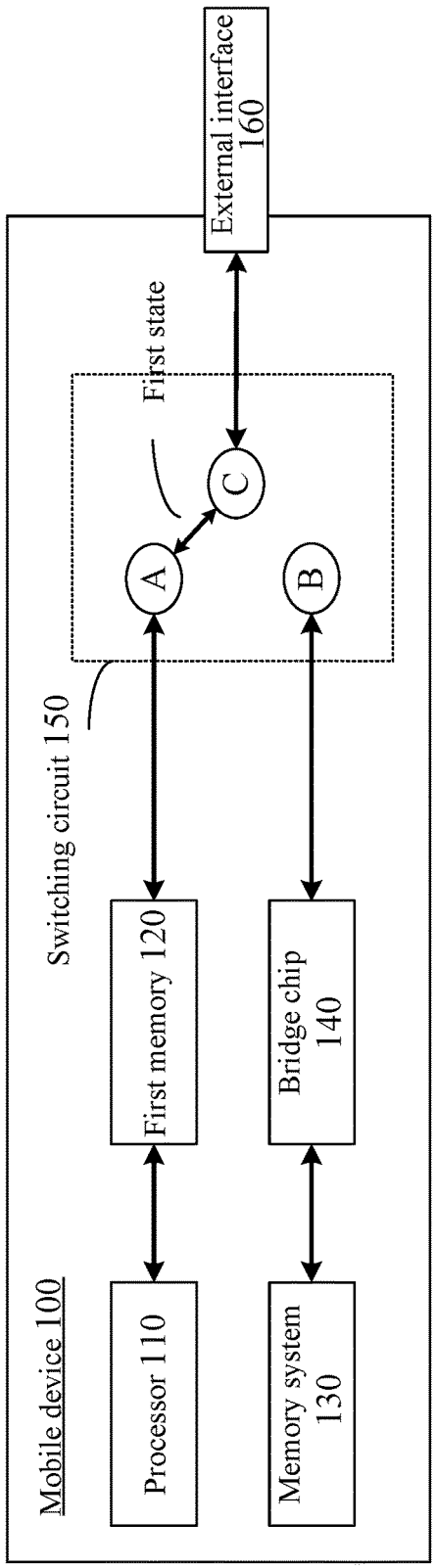
FIG. 1 is a schematic diagram of a mobile device in a first state according to an example of the present disclosure.

To facilitate understanding of the present disclosure, examples of the present disclosure will be described in more detail below with reference to the accompanying drawings. Although examples of the present disclosure are shown in the drawings, it should be understood that the present disclosure may be implemented in various ways and should not be limited to the DETAILED DESCRIPTION set forth herein. Rather, these examples are provided so that the present disclosure can be more thoroughly understood and the scope of the present disclosure can be fully conveyed to those skilled in the art.

In the following description, numerous specific details are given in order to provide a more thorough understanding of the present disclosure. It will be apparent, however, to one skilled in the art that the present disclosure may be practiced without one or more of these details. In some examples, some technical features well-known in the art are not described to avoid confusion with the present disclosure; that is, not all features of the actual example are described here, and well-known functions and structures are not described in detail.

Terms can be understood, at least in part, from usage in the context. For example, depending at least in part on context, the term "one or more" as used herein may be used to describe any feature, structure or characteristic in the singular sense, or may be used to describe a combination of features, structures or characteristics in the plural sense. Similarly, terms such as "a/an" or "said" may equally be understood to convey a singular usage or to convey a plural usage, depending at least in part on the context. Additionally, the term "based on" may be understood as not intended to convey an exclusive set of factors, and may instead allow for the presence of additional factors that are not explicitly described, again depending at least in part on the context.

The terminology used herein is for the purpose of describing particular examples only and is not to be taken as a limitation of the present disclosure unless otherwise stated. As used herein, "a", "an" and "said/the" in singular forms are intended to include the plural forms as well, unless the context clearly dictates otherwise. It should also be understood that at least one of the terms "consists of" or "comprising", when used in this specification, identify the presence of at least one of stated features, integers, operations, elements or components, but do not exclude presence or addition of at least one of one or more other features, integers, operations, elements, components or groups. As used herein, the term "at least one of . . . " includes any and all combinations of the associated listed items.

In order to thoroughly understand the present disclosure, detailed operations and detailed structures will be provided in the following description to explain the technical solutions of the present disclosure. Examples of the present disclosure are described in detail below. However, in addition to these detailed descriptions, the present disclosure may be implemented in other ways.

As a common mobile device, cell phones are widely used in daily life, but the storage capacity of cell phones is limited and can easily fill up. As the behavior of storing large amount of data (for example, saving short videos, movies, TV series, audios) becomes more and more common, user's demands for larger storage capacity emerge. Therefore, additional storage space is required.

However, the storage capacity of the above-mentioned mobile devices is limited and it is difficult to meet the increasing demands for storage capacity of users. Therefore, how to make mobile devices have both communication and mobile storage functions has become an urgent technical problem to be solved.

Mobile storage is favored by consumers owing to the advantages such as repeatedly erasable and large storage capacity. Mobile storage includes but is not limited to USB flash disk, mobile hard disk, memory card, etc. By backing up data into the cell phone to mobile storage, additional storage space may be offered for cell phone to free up the memory of the cell phone. However, in this solution, users need to purchase and carry both the cell phone and the mobile storage at the same time, resulting in increased costs and reduced portability for the user.

Moreover, backing up data in the cell phone into mobile storage typically requires the use of other devices, making the user's experience poor. For example, the cell phone and mobile storage are connected to the computer respectively to copy the data; after the copy is completed, the cell phone and mobile storage connected to the computer are unplugged. In addition, users need to purchase additional supporting data cables and the like, resulting in further increase in user's costs and further reduction in portability.

Based on this, the examples of the present disclosure provide a mobile device in order to solve one or more of the above technical problems.

Figure 2:
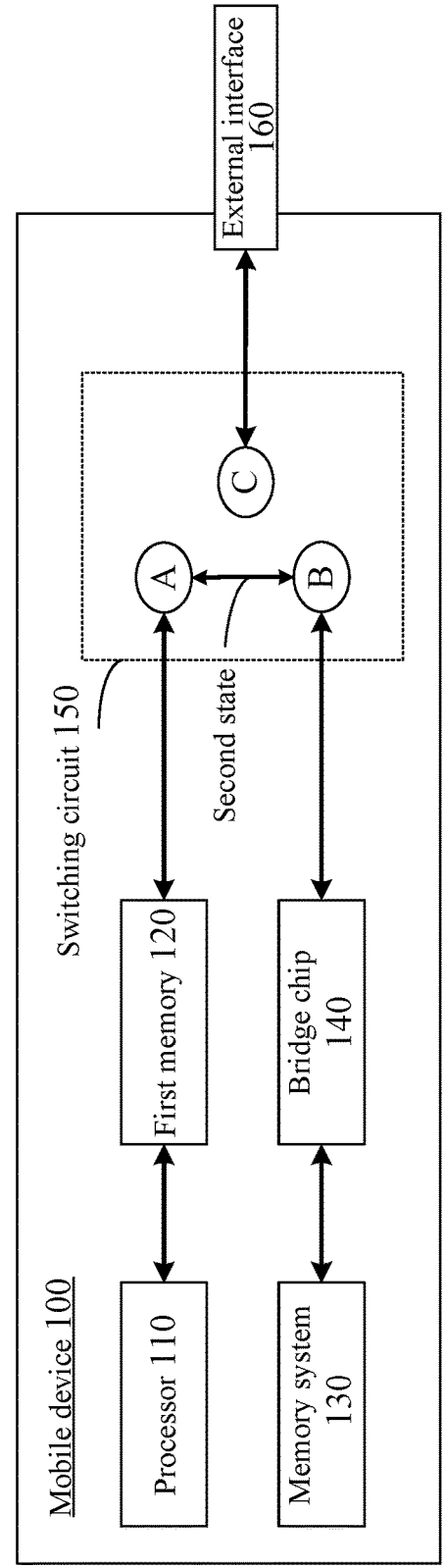
FIG. 2 is a schematic diagram of a mobile device in a second state according to an example of the present disclosure.

FIG. 1 is a schematic diagram of a mobile device 100 in a first state according to an example of the present disclosure. FIG. 2 is a schematic diagram of a mobile device 100 in a second state according to an example of the present disclosure. FIG. 3 is a schematic diagram of a mobile device 100 in a third state according to an example of the present disclosure. The mobile device 100 provided by the examples of the present disclosure will be described below with reference to FIGS. 1 to 3.

Referring to FIG. 1, the mobile device 100 includes: a first memory 120, a memory system 130, a switching circuit 150 and an external interface 160. The switching circuit 150 is configured to: in response to a switching instruction, switch from a first state to a second state or a third state, wherein the switching instruction is to indicate to access the memory system 130, and in the first state, the first memory 120 is coupled to the external interface 160 via the switching circuit 150; in the second state, the memory system 130 is coupled to the first memory 120 via the switching circuit 150; and in the third state, the memory system 130 is coupled to the external interface 160 via the switching circuit 150.

The mobile device 100 includes but is not limited to a smart phone (e.g., a cell phone), a tablet computer (e.g., a tablet), or a laptop computer and the like. In this example of the present disclosure, the mobile device 100 is a cell phone as an example. The mobile device 100 includes a first memory 120, a memory system 130, a switching circuit 150 and an external interface 160. The mobile device 100 may also include other functional devices known in the art, such as power management chips, baseband chips, radio frequency chips, WIFI chips and the like, although not shown in FIG. 1.

The first memory 120 includes at least one of a volatile memory or a non-volatile memory. Volatile memories include but are not limited to Static Random Access Memory (SRAM), Dynamic Random Access Memory (DRAM), etc. Non-volatile memories include but are not limited to Read-Only Memory (ROM), flash memory, etc.

In the example of the present disclosure, the first memory 120 can be a running memory and/or an internal memory of the cell phone. The number of the first memory 120 is not limited to one as shown in FIG. 1, but may be two or more. The storage capacity of the first memory 120 includes but is not limited to 32G, 64G, 128G or 256G. Of course, the storage capacity of the first memory 120 can be less than 32G (for example, 16G) or greater than 256G (for example, 512G). The number and storage capacity of the first memory 120 are not particularly limited in the examples of the present disclosure.

The memory system 130 includes one or more second memories 131 and a memory controller 132. The memory controller 132 is coupled to the second memories 131 and the switching circuit 150 and is configured to control the second memories 131. The memory controller 132 can manage data stored in the second memory 131 and communicate with the processor 110 or an external terminal. The memory system 130, the second memory 131 and the memory controller 132 will be described in detail in the examples with reference to FIGS. 4 and 5, and will not be repeated here.

The switching circuit 150 can switch from a first state to a second state or a third state in response to a switching instruction. The functional circuit inside the mobile device 100 or the external terminal can access the memory system 130, so that the mobile device 100 has both communication and mobile storage functions.

For example, referring to FIGS. 1 and 2, when the processor 110 needs to access the memory system 130, the switching circuit 150 can switch from the first state to the second state after receiving the switching instruction, so that the processor 110 is coupled to the memory system 130 via the switching circuit 150 to achieve access to the memory system 130. At this time, the memory system 130 can be used as an extended memory of the mobile device 100, thereby offering additional storage space for the mobile device 100 to increase the storage capacity of the mobile device 100 without affecting the communication function of the mobile device 100.

It should be noted that when other functional circuits inside the mobile device 100 need to access the memory system 130, the switching circuit 150 can perform operations similar to those in FIG. 1 and FIG. 2, so that other functional circuits inside the mobile device 100 are coupled to the memory system 130 via the switching circuit 150 to achieve access to the memory system 130. In the example of the present disclosure, the functional circuit inside the mobile device 100 that accesses the memory system 130 is not limited to the processor 110.

For example, referring to FIGS. 1 and 3, when an external terminal needs to access the memory system 130, the switching circuit 150 can switch from the first state to the third state after receiving the switching instruction, so that the external terminal is coupled to the memory system 130 via the external interface 160 and the switching circuit 150 to achieve access to the memory system 130. At this time, the mobile device 100 can act as not only a communication device, but also a mobile storage device. That is, the mobile device 100 has both communication and mobile storage functions. External terminals include but are not limited to desktop computers or notebook computers.

The switching circuit 150 includes a switch circuit, such as a paddle switch circuit, a membrane switch circuit, and the like. In an example, the switching circuit 150 is the paddle switch circuit, and the paddle switch circuit may have at least three tap positions each corresponding to one of the first state, the second state, and the third state. Different tap positions correspond to different states, and therefore, switching between different states can be achieved. Here, it is only an example that the switching circuit 150 includes the switch circuit. The switching circuit 150 may also include other circuits that can implement switching functions, such as multiplexer circuits, cross-bar switching circuits, or switch matrix circuits.

The external interface 160 includes a Universal Serial Bus (USB) interface, such as a Micro USB interface, Type-c interface, Lightning interface and the like. In the example of this disclosure, the external interface 160 is a Type-c interface as an example for illustration.

In the example of the present disclosure, a switching circuit and a memory system are provided in a mobile device, and the switching circuit can switch from a first state to a second state or a third state in response to a switching instruction, so that the memory system can be used as an expanded memory of the mobile device or the mobile device can be used as mobile storage. On the one hand, additional storage space is offered for the mobile device to increase the storage capacity of the mobile device, and the communication function of the mobile device is not affected. On the other hand, the cell phone and mobile storage products are incorporated as one product. The mobile device has both communication and mobile storage functions, which can reduce the cost of use of the user and enhance portability.

In some examples, the switching instruction comprises a first sub-switching instruction, and the first sub-switching instruction is to indicate to switch to the second state. The mobile device 100 further comprises: a processor 110 coupled to the first memory 120.

The switching circuit 150 comprises: a first port coupled to the first memory 120; a second port coupled to the memory system 130; and a third port coupled to the external interface 160.

The switching circuit 150 is configured to: in response to the first sub-switching instruction from the processor 110, switch the first port from being coupled with the third port to being coupled with the second port.

The processor 110 includes a dedicated processor, such as at least one of a Central Processing Unit (CPU), a Graphics Processing Unit (GPU), a Digital Signal Processor (DSP), a Tensor Processing Unit (TPU), A Video Processing Unit (VPU) or many other dedicated processors. The processor 110 may also include a System on Chip (SoC) integrated with multiple dedicated processors, such as an Application Processor (AP), a baseband processor, etc., wherein the application processor handles applications running in the operating system environment, and the baseband processor handles cellular mobile communications, such as second generation (2G), third generation (3G), fourth generation (4G), fifth generation (5G) cellular mobile communications, etc. It should be noted that the processor 110 can complete various operations disclosed in the examples of the present disclosure through integrated logic circuits of hardware and/or instruction codes in the form of software.

For example, referring to FIGS. 1 and 2, when the processor 110 needs to access the memory system 130, the processor 110 can send a first sub-switching instruction to the switching circuit 150. The switching circuit 150 switches from A-C connection to A-B connection in response to the first sub-switching instruction so that the processor 110 is coupled to the memory system 130 via the switching circuit 150.

As an example, the switching circuit 150 is a paddle switch circuit. The paddle switch circuit includes a first tap position, a second tap position and a third tap position corresponding to a first state, a second state and a third state respectively. After receiving the first sub-switching instruction, the switching circuit 150 can switch from the first tap position to the second tap position, thereby switching to the second state.

In some examples, the three nodes A, B, and C represent a first port, a second port, and a third port respectively. In some other examples, at least one of the three nodes A, B, or C may be a connection node inside the switching circuit 150. For example, A is the connection node inside the switching circuit 150, and the node A can be connected to the first port. In practical applications, those skilled in the art can reasonably configure the first port, the second port and the third port according to needs, and the present disclosure does not impose any special restrictions on this.

In some examples, the processor 110 is configured to: back up data stored in the first memory 120 into a second memory 131 of the memory system 130; or read data stored in a second memory 131 of the memory system 130.

Referring to FIG. 2, as the switching circuit 150 is switched to the second state, the memory system 130 can be used as an extended memory of the mobile device 100. For example, when the available storage space of the first memory 120 is insufficient, the processor 110 can back up the data stored in the first memory 120 into the second memory 131 of the memory system 130, and erase the data which has been backed up already in the first memory 120, thereby releasing at least one of the running memory or internal memory of the mobile device 100 and improving the operating performance of the mobile device 100. Moreover, by backing up the data stored in the first memory 120 into the second memory 131 of the memory system 130, data loss can be avoided and data reliability can be ensured. In addition, data backup is completed within the mobile device 100 without requiring other devices, which improves speed of data transmission and backup efficiency.

It should be noted that an application can be installed into the cell phone, and the user can complete the switching of state of the circuit and the backup of the data stored in the first memory by operating the application, in practical applications.

For example, when the data that the processor 110 needs to read is stored in the second memory 131, the processor 110 may send a first sub-switching instruction to the switching circuit 150. The switching circuit 150 switches from A-C connection to A-B connection in response to the first sub-switching instruction. In this way, the processor 110 can read the data stored in the second memory 131. Since the reading of data is completed inside the mobile device 100 without requiring other devices, the speed of data transmission and reading efficiency can be increased.

In the example of the present disclosure, after the first port of the switching circuit is switched from being coupled to the third port to being coupled to the second port, the switching circuit can be switched to the second state. In this way, the memory system can be used as an extended memory of the mobile device, and backing up the data in the first memory into the memory system no longer requires the use of other devices or supporting products. Therefore, the user experience is enhanced, the cost of use is further reduced, and the portability is further enhanced. Data is backed up or read inside the mobile device without requiring other devices, which can improve backup efficiency or reading efficiency.

In some examples, the switching instruction further comprises a second sub-switching instruction, and the second sub-switching instruction is to indicate to switch to the third state. The switching circuit 150 is further configured to:
  in response to the second sub-switching instruction from the processor 110, switch from the second state to the third state.

For example, referring to FIGS. 2 and 3, when an external terminal needs to access the memory system 130, the processor 110 can send a second sub-switching instruction to the switching circuit 150. The switching circuit 150 switches from A-B connection to B-C connection in response to the second sub-switching instruction, so that the external terminal is coupled to the memory system 130 via the switching circuit 150.

As an example, the switching circuit 150 is a paddle switch circuit. The paddle switch circuit includes a first tap position, a second tap position and a third tap position corresponding to a first state, a second state and a third state respectively. After receiving the second sub-switching instruction, the switching circuit 150 can switch from the second tap position to the third tap position, thereby switching to the third state.

In some examples, the switching circuit 150 is further configured to: in response to a resume instruction from the processor 110, switch from the second state or the third state to the first state.

In some examples, the switching circuit 150 is configured to: in response to the resume instruction from the processor 110, switch the first port from being coupled with the second port to being coupled with the third port. In this way, the switching circuit 150 can be switched from the second state to the first state.

For example, referring to FIG. 2, after the data in the first memory 120 has been backed up, the processor 110 can send the resume instruction to the switching circuit 150. The switching circuit 150 switches from A-B connection to A-C connection in response to the resume instruction, such that the mobile device 100 is switched to a normal state (i.e., the first state), as shown in FIG. 1. It should be noted that the mobile device 100 is used as a communication tool in the normal state.

In some examples, the switching circuit 150 is configured to: in response to the resume instruction from the processor 110, switch the third port from being coupled with the second port to being coupled with the first port. In this way, the switching circuit 150 can be switched from the third state to the first state.

For example, referring to FIG. 3, after the external terminal has completed access to the memory system 130, the processor 110 may send the resume instruction to the switching circuit 150. The switching circuit 150 switches from B-C connection to A-C connection in response to the resume instruction, as shown in FIG. 1, such that the mobile device 100 is switched to the normal state.

It should be noted that the resume instruction for switching from the second state to the first state and the resume instruction for switching from the third state to the first state may be the same or different, and the present disclosure has no special limitation on this.

In some examples, the switching circuit 150 is configured to: in response to the switching instruction from the processor 110, switch the third port from being coupled with the first port to being coupled with the second port, wherein the external interface 160 is coupled to an external terminal.

For example, referring to FIGS. 1 and 3, when an external terminal needs to access the memory system 130, the processor 110 can send a switching instruction to the switching circuit 150. In response to the switching instruction, the switching circuit 150 switches from A-C connection to B-C connection, such that the external terminal to be coupled to the memory system 130 via the external interface 160 and the switching circuit 150, thereby achieving access to the memory system 130.

It can be understood that the switching circuit 150 provided by the example of the present disclosure can switch between any two states to complete corresponding logical operations.

In some examples, the memory system 130 includes a second memory 131 and a memory controller 132. The second memory 131 and the memory controller 132 are jointly packaged on the motherboard of the mobile device 100. The mobile device 100 further includes a bridge chip 140, and the memory system 130 is coupled to the external interface 160 via the bridge chip 140.

For example, referring to FIG. 1, the second memory 131 and the memory controller 132 may be packaged jointly into a memory system 130 and then packaged on the motherboard of the mobile device 100. The memory system 130 includes at least one of an Embedded Multimedia Card (eMMC), a Universal Flash Storage (UFS), or a Solid State Disk (SSD). Motherboards include but are not limited to printed circuit boards (PCBs).

Data, addresses, commands and the like can be transmitted between the memory system 130 and the first memory 120 or an external terminal via the bridge chip 140. The bridge chip 140 is configured to perform interface protocol conversion on signals (including data signals and/or control signals) transmitted between the memory system 130 and the first memory 120 or an external terminal. The bridge chip 140 includes a first interface coupled to the memory system 130, a second interface coupled to the second port, and a conversion unit configured to convert an interface protocol followed between the first interface and the memory system 130 into an interface protocol followed between the second interface and the first memory 120 or the external terminal, thereby ensuring signal transmission between the memory system 130 and the first memory 120 or the external terminal. Interface protocols include USB protocol, SATA protocol, PCIE protocol, etc.

In the example of the present disclosure, by providing the bridge chip in the mobile device, the memory system composed of the second memory and the memory controller jointly packaged on the motherboard can be coupled to the external port via the bridge chip. In this way, the conversion of the interface protocol can be realized, ensuring signal transmission between the memory system and the external terminal (or the first memory).

FIG. 4 is a schematic diagram of another mobile device 100 according to an example of the present disclosure. The processor 110, the first memory 120, the memory system 130, the switching circuit 150, and the external interface 160 in FIG. 4 are similar to those in the above examples and will not be described again. Different from the above examples, the memory system 130 in FIG. 4 includes a second memory 131 and a memory controller 132. The second memory 131 and the memory controller 132 are separately packaged on the motherboard of the mobile device 100, and the second memory 131 is coupled to the external interface 160 via the memory controller 132.

It can be understood that in the example of the present disclosure, the second memory 131 and the memory controller 132 can be separately packaged on the motherboard as an independent component (for example, a die). When the second memory 131 and the memory controller 132 are separately packaged on the motherboard, the bridge chip 140 may be omitted.

In some examples, mobile device 100 is configured for at least one of communication or mobile storage.

Figure 5:
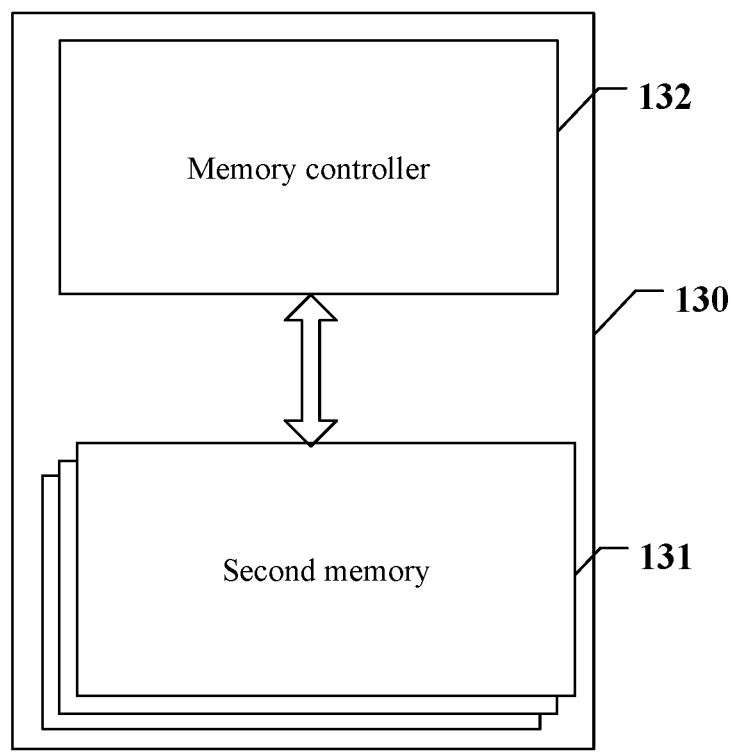
FIG. 5 is a schematic diagram of a memory system according to an example of the present disclosure.

FIG. 5 is a schematic diagram of a memory system 130 according to an example of the present disclosure. Referring to FIG. 5, the memory system 130 includes one or more second memories 131 and a memory controller 132. The memory controller 132 is coupled to the second memory 131 and the switching circuit (see FIG. 4) and is configured to control the second memory 131. The memory controller 132 can manage data stored in the second memory 131 and communicate with a processor or an external terminal.

In some examples, the memory controller 132 is designed to operate in a low duty-cycle environment, such as a Secure Digital Memory Card (SD Card), a Compact Flash Card (CF Card), Universal Serial Bus flash drives, or other media for use in electronic devices such as personal computers, digital cameras, mobile phones, and the like. In some examples, the memory controller 132 is designed for operating in a high duty-cycle environment, such as a solid state drive or embedded multimedia card, SSD or eMMC used as data storage in mobile devices such as smartphones, tablets, laptops and the like as well as enterprise storage arrays.

The memory controller 132 may be configured to control operations of the second memory 131, such as read, erase, and write operations. The memory controller 132 may also be configured to manage various functions regarding data stored or to be stored in the second memory 131, including but not limited to bad block management, garbage collection, logical to physical address translation, wear leveling, etc. In some examples, the memory controller 132 is further configured to process error correction codes with regard to data read from or written into the second memory 131. The memory controller 132 may also perform any other suitable functions, such as formatting the second memory 131. The memory controller 132 can communicate with an external terminal according to a specific communication protocol. For example, the memory controller 132 may communicate with an external terminal via at least one of various interface protocols, such as USB protocol, MMC protocol, Peripheral Component Interconnect (PCI) protocol, Peripheral Component Interconnect Express (PCIE) protocol, Advanced Technology Attachment (ATA) protocol, Serial ATA protocol, Parallel ATA protocol, Small Computer System Interface (SCSI) protocol, Enhanced System Device Interface (ESDI) protocol, Integrated Drive Electronics (IDE) protocol, Firewire protocol, etc.

Figure 6A:
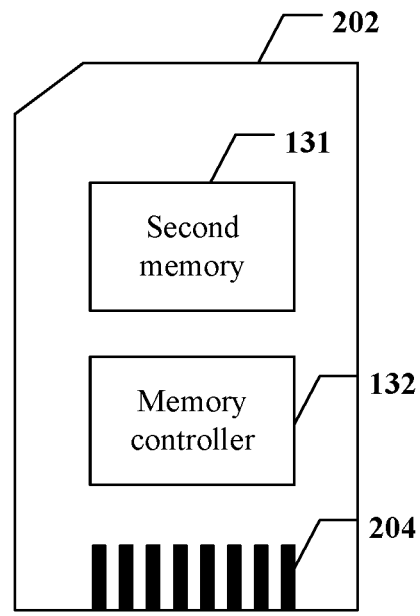
FIG. 6A is a schematic diagram of a memory card according to an example of the present disclosure.
Figure 6B:
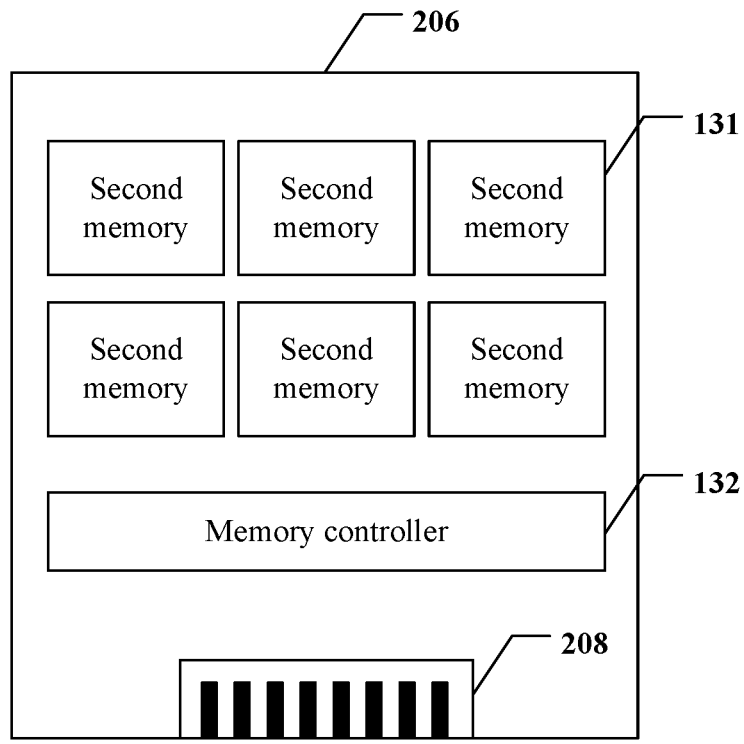
FIG. 6B is a schematic diagram of a solid state drive according to an example of the present disclosure.

The memory controller 132 and the one or more second memories 131 may be integrated into various types of memory devices, for example, included in the same package (e.g., a universal flash storage package or an eMMC package). That is, the memory system 130 may be implemented and packaged into different types of end electronic products. In one example as shown in FIG. 6A, the memory controller 132 and a single second memory 131 may be integrated into a memory card 202. The memory card 202 may include a PC card (Personal Computer Memory Card International Association, PCMCIA), CF card, Smart Media (SM) card, memory stick, Multi Media Card (MMC), Reduced-Size MMC (RS-MMC), Multi Media Card Micro (MMCmicro), SD card (SD, miniSD, microSD, SDHC), Universal Flash Storage (UFS) and the like. Memory card 202 may also include a memory card connector 204 that couples memory card 202 with a bridge chip (e.g., the bridge chip in FIG. 1). In another example as shown in FIG. 6B, the memory controller 132 and a plurality of second memories 131 may be integrated into the SSD 206. SSD 206 may also include an SSD connector 208 that couples SSD 206 with a bridge chip (e.g., the bridge chip in FIG. 1). In some examples, at least one of the storage capacity or operating speed of SSD 206 is greater than that of memory card 202. The second memory 131 may include volatile memory and non-volatile memory, such as NAND flash memory, dynamic random access memory, ferroelectric random access memory, magnetic random access memory, phase change random access memory, resistive random access memory, nano random access memory and the like.

Based on the above mobile device, the examples of the present disclosure further provide an operation method of the mobile device.

Figure 7:
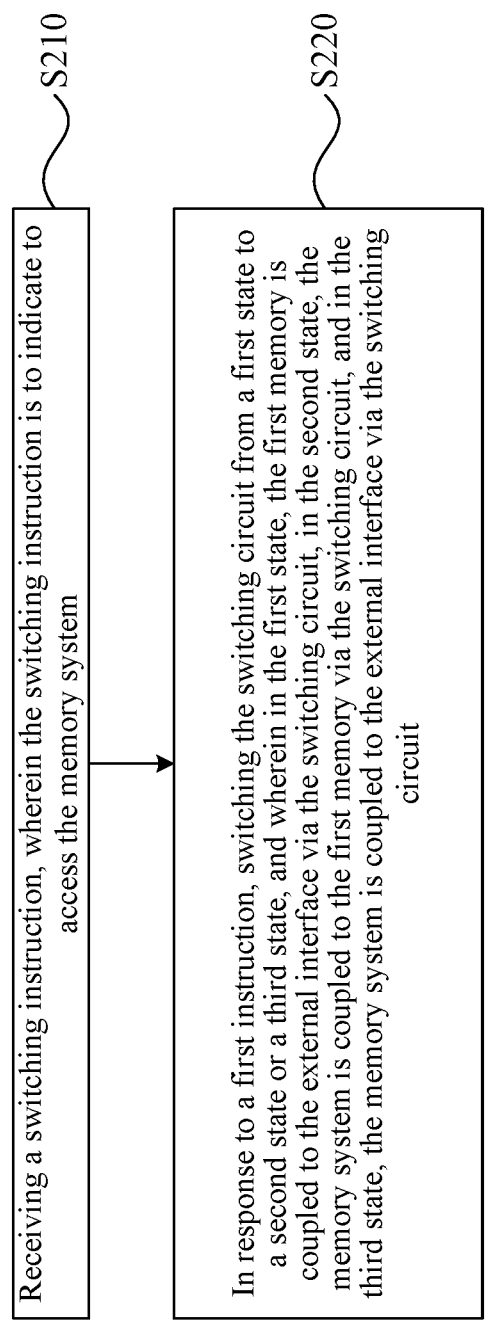
FIG. 7 is a flow chart of an operation method of a mobile device according to an example of the present disclosure.

FIG. 7 is a flow chart of an operation method of a mobile device according to an example of the present disclosure. Referring to FIG. 7, the operation method includes at least the following operations:

S210: receiving a switching instruction, wherein the switching instruction is to indicate to access the memory system;

S220: in response to the switching instruction, switching the switching circuit from a first state to a second state or a third state, and wherein in the first state, the first memory is coupled to the external interface via the switching circuit, in the second state, the memory system is coupled to the first memory via the switching circuit, and in the third state, the memory system is coupled to the external interface via the switching circuit.

It should be noted that the operations shown in FIG. 7 are not exclusive, other operations can also be performed before, after, or between any operations in the operations shown, and the order of operations shown in FIG. 7 can be adjusted according to actual needs.

In some examples, the mobile device further comprises a processor coupled to the first memory, and the switching circuit comprises: a first port coupled to the first memory; a second port coupled to the memory system; and a third port coupled to the external interface.

The above operation S210 comprises: receiving a first sub-switching instruction from the processor, wherein the switching instruction comprises the first sub-switching instruction, and the first sub-switching instruction is to indicate to switch to the second state.

The above operation S220 comprises: in response to the first sub-switching instruction from the processor, switching from coupling the first port with the third port to coupling the first port with the second port.

In some examples, the above operation method further comprises: backing up data stored in the first memory into a second memory of the memory system; or reading data stored in a second memory of the memory system.

In some examples, the above operation S210 further comprises: receiving a second sub-switching instruction from the processor, wherein the switching instruction comprises the second sub-switching instruction, and the second sub-switching instruction is to indicate to switch to the third state. The above-mentioned operation method further comprises: in response to the second sub-switching instruction from the processor, switching the switching circuit from the second state to the third state.

In some examples, the above operation method further comprises: in response to a resume instruction from the processor, switching the switching circuit from the second state or the third state to the first state.

In some examples, the above operation S220 comprises: in response to the switching instruction from the processor, switching from coupling the third port with the first port to coupling the third port with the second port, wherein the external interface is coupled to an external terminal.

The above operation methods have been introduced in detail on the mobile device side, and will not be repeated here for the sake of brevity.

Based on the above mobile device, examples of the present disclosure further provide a system.

Figure 8:
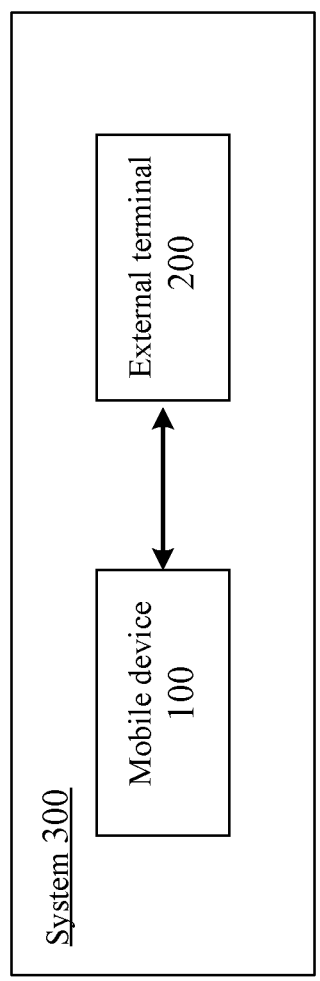
FIG. 8 is a schematic diagram of a system according to an example of the present disclosure.

FIG. 8 is a schematic diagram of a system 300 according to an example of the present disclosure. Referring to FIG. 8, the system 300 comprises:

the mobile device 100 as set forth in any of the above examples; and
an external terminal 200 coupled to the mobile device 100 and configured to: access the first memory 120 when the switching circuit 150 is in the first state; or access the memory system 130 when the switching circuit is in the third state.

In some examples, the external terminal comprises a desktop computer or a notebook computer.

Based on the above mobile device, the examples of the present disclosure further provide a computer-readable storage medium storing thereon instruction codes that, when executed, implement the operation methods in any of the above examples.

In some examples, the instruction codes may be a computer program. The computer-readable storage medium may be applied to the mobile device in the example of the present application, and the computer program causes the mobile device to perform corresponding operations in the various operation methods of the example of the present application, which are not repeated here for the sake of brevity.

In view of this, examples of the present disclosure provide a mobile device and an operation method thereof, a system, and a computer-readable storage medium.

In a first aspect, an example of the present disclosure provides a mobile device, comprising: a first memory, a memory system, a switching circuit, and an external interface;
 the switching circuit is configured to: in response to a switching instruction, switch from a first state to a second state or a third state, wherein the switching instruction is to indicate to access the memory system, and wherein in the first state, the first memory is coupled to the external interface via the switching circuit, in the second state, the memory system is coupled to the first memory via the switching circuit, and in the third state, the memory system is coupled to the external interface via the switching circuit.

In some examples, the switching instruction comprises a first sub-switching instruction, wherein the first sub-switching instruction is to indicate to switch to the second state; and the mobile device further comprises a processor coupled to the first memory;
 the switching circuit comprises: a first port coupled to the first memory; a second port coupled to the memory system; and a third port coupled to the external interface, and
 the switching circuit is configured to: in response to the first sub-switching instruction from the processor, switch the first port from being coupled with the third port to being coupled with the second port.

In some examples, the processor is configured to:
 back up data stored in the first memory into a second memory of the memory system;
 or
 read data stored in a second memory of the memory system.

In some examples, the switching instruction further comprises a second sub-switching instruction, the second sub-switching instruction is to indicate to switch to the third state, and the switching circuit is further configured to: in response to the second sub-switching instruction from the processor, switch from the second state to the third state.

In some examples, the switching circuit is further configured to: in response to a resume instruction from the processor, switch from the second state or the third state to the first state.

In some examples, the switching circuit is configured to: in response to the switching instruction from the processor, switch the third port from being coupled with the first port to being coupled with the second port, wherein the external interface is coupled to an external terminal.

In some examples, the memory system comprises a second memory and a memory controller, the second memory and the memory controller are jointly packaged on a motherboard of the mobile device, and the mobile device further comprises a bridge chip, and the memory system is coupled to the external interface via the bridge chip.

In some examples, the memory system comprises a second memory and a memory controller, the second memory and the memory controller are separately packaged on a motherboard of the mobile device, and the second memory is coupled to the external interface via the memory controller.

In some examples, the memory system comprises at least one of an embedded multimedia card, a universal flash storage, or a solid state disk.

In some examples, the mobile device is configured for at least one of communication or mobile storage.

In some examples, the mobile device comprises a cell phone or a tablet computer.

In a second aspect, the examples of the present disclosure provide an operation method of a mobile device, wherein the mobile device comprises a first memory, a memory system, a switching circuit and an external interface, and the operation method comprises:
 receiving a switching instruction, wherein the switching instruction is to indicate to access the memory system; and
 in response to the switching instruction, switching the switching circuit from a first state to a second state or a third state, and wherein in the first state, the first memory is coupled to the external interface via the switching circuit, in the second state, the memory system is coupled to the first memory via the switching circuit, and in the third state, the memory system is coupled to the external interface via the switching circuit.

In some examples, the mobile device further comprises a processor coupled to the first memory, the switching circuit comprises: a first port coupled to the first memory; a second port coupled to the memory system; and a third port coupled to the external interface, and
 the receiving a switching instruction comprises: receiving a first sub-switching instruction from the processor, wherein the switching instruction comprises the first sub-switching instruction, and the first sub-switching instruction is to indicate to switch to the second state; and
 the in response to the switching instruction, switching the switching circuit from a first state to a second state comprises: in response to the first sub-switching instruction from the processor, switching from coupling the first port with the third port to coupling the first port with the second port.

In some examples, the operation method further comprises:
 backing up data stored in the first memory into a second memory of the memory system;
 or
 reading data stored in a second memory of the memory system.

In some examples, the receiving a switching instruction further comprises: receiving a second sub-switching instruction from the processor, wherein the switching instruction comprises the second sub-switching instruction, and the second sub-switching instruction is to indicate to switch to the third state; and the operation method further comprises: in response to the second sub-switching instruction from the processor, switching the switching circuit from the second state to the third state.

In some examples, the operation method further comprises: in response to a resume instruction from the processor, switching the switching circuit from the second state or the third state to the first state.

In some examples, the in response to the switching instruction, switching the switching circuit from a first state to a third state comprises: in response to the switching instruction from the processor, switching from coupling the third port with the first port to coupling the third port with the second port, wherein the external interface is coupled to an external terminal.

In a third aspect, the examples of the present disclosure provide a system, comprising:
the mobile device as set forth in any of the above examples; and
an external terminal coupled to the mobile device and configured to: access the first memory when the switching circuit is in the first state; or access the memory system when the switching circuit is in the third state.

In a fourth aspect, the examples of the present disclosure provide a computer-readable storage medium storing thereon instruction codes that, when executed, implement the operation method as set forth in any of the above examples.

In the example of the present disclosure, a switching circuit and a memory system are provided in a mobile device, and the switching circuit can switch from a first state to a second state or a third state in response to a switching instruction, so that the memory system can be used as an expanded memory of the mobile device or the mobile device can be used as mobile storage. On the one hand, additional storage space is offered for the mobile device to increase the storage capacity of the mobile device, and the communication function of the mobile device is not affected. On the other hand, the cell phone and mobile storage products are incorporated as one product. The mobile device has both communication and mobile storage functions, which can reduce the cost of use of the user and enhance portability.

It will be understood that reference throughout this specification to "one example" or "an example" means that a particular feature, structure, or characteristic associated with the example is included in at least one example of the present disclosure. Thus, the appearances of "in one example" or "in an example" in various places throughout this specification are not referring to the same example. Furthermore, the particular features, structures or characteristics may be combined in any suitable manner in one or more examples. It should be understood that in various examples of the present disclosure, the size of the sequence numbers of the above-mentioned processes does not mean the order of execution. The execution order of each process should be determined by its functions and internal logic, and should not constitute any limitation to the implementation process of the present disclosure. The above sequence numbers of the examples of the present disclosure are only for description and do not represent the advantages and disadvantages of the examples.

It should be noted that, the terms "comprising", "including" or any other variations thereof as used herein are intended to cover a non-exclusive inclusion, such that a process, method, article or apparatus that includes a series of elements includes not only those elements, but also other elements not expressly listed or inherent in the process, method, article or apparatus. Without further limitation, an element defined by the statement "comprises a . . . " does not exclude the presence of additional identical elements in a process, method, article or apparatus that includes that element.

The foregoing descriptions are only examples of the present disclosure, but the protection scope of the present disclosure is not limited thereto. Any skills familiar with the technical field can easily conceive of changes or substitutions within the technical scope disclosed in the present disclosure, which are covered by the protection scope of this disclosure. Therefore, the protection scope of the present disclosure should be subject to the protection scope of the claims.

What is claimed is:

1. A mobile device, comprising:
a first memory;
a memory system, wherein the memory system comprises a second memory and a memory controller that are jointly packaged on a motherboard of the mobile device;
an external interface;
a bridge chip, wherein the memory system is coupled to the external interface via the bridge chip; and
a switching circuit configured to, in response to a switching instruction, switch from a first state to a second state or a third state, wherein the switching instruction indicates to the switching circuit to access the memory system, and wherein:
in the first state, the first memory is coupled to the external interface via the switching circuit;
in the second state, the memory system is coupled to the first memory via the switching circuit; and
in the third state, the memory system is coupled to the external interface via the switching circuit.

2. The mobile device according to claim 1, further comprising:
a processor coupled to the first memory, wherein the switching instruction comprises a first sub-switching instruction, and the first sub-switching instruction is to indicate to switch to the second state;
wherein the switching circuit comprises:
a first port coupled to the first memory;
a second port coupled to the memory system; and
a third port coupled to the external interface; and
wherein the switching circuit is configured to, in response to the first sub-switching instruction from the processor, switch the first port from being coupled with the third port to being coupled with the second port.

3. The mobile device according to claim 2, wherein the processor is configured to:
back up data stored in the first memory into the second memory of the memory system; or
read data stored in the second memory of the memory system.

4. The mobile device according to claim 2, wherein the switching instruction further comprises a second sub-switching instruction, the second sub-switching instruction is to indicate to switch to the third state; and
the switching circuit is further configured to, in response to the second sub-switching instruction from the processor, switch from the second state to the third state.

5. The mobile device according to claim 2, wherein the switching circuit is further configured to, in response to a resume instruction from the processor, switch from the second state or the third state to the first state.

6. The mobile device according to claim 2, wherein the switching circuit is configured to, in response to the switching instruction from the processor, switch the third port from being coupled with the first port to being coupled with the second port, wherein the external interface is coupled to an external terminal.

7. The mobile device according to claim 1, wherein the second memory and the memory controller are separately packaged on the motherboard of the mobile device, and the second memory is coupled to the external interface via the memory controller.

8. The mobile device according to claim 1, wherein the memory system comprises at least one of an embedded multimedia card, a universal flash storage, or a solid state disk.

9. The mobile device according to claim 1, wherein the mobile device is configured for at least one of communication or mobile storage.

10. The mobile device according to claim 1, wherein the mobile device comprises a cell phone or a tablet computer.

11. An operation method of a mobile device, wherein the mobile device comprises:
a first memory;
a processor coupled to the first memory;
a memory system;
an external interface;
a switching circuit, wherein the switching circuit comprises:
a first port coupled to the first memory;
a second port coupled to the memory system; and
a third port coupled to the external interface; and
the operation method comprises:
receiving a switching instruction, wherein the switching instruction indicates to the switching circuit to access the memory system, and wherein receiving the switching instruction comprises receiving a first sub-switching instruction to indicate to switch to a second state; and
in response to the switching instruction, switching the switching circuit from a first state to the second state or a third state, wherein the switching the switching circuit from the first state to the second state comprises, in response to the first sub-switching instruction from the processor, switching the first port from being coupled with the third port to being coupled with the second port, and wherein:
in the first state, the first memory is coupled to the external interface via the switching circuit;
in the second state, the memory system is coupled to the first memory via the switching circuit; and
in the third state, the memory system is coupled to the external interface via the switching circuit.

12. The operation method according to claim 11, further comprising:
backing up data stored in the first memory into a second memory of the memory system; or
reading data stored in the second memory of the memory system.

13. The operation method according to claim 11, wherein the receiving the switching instruction further comprises:
receiving a second sub-switching instruction from the processor, wherein the switching instruction comprises the second sub-switching instruction, and the second sub-switching instruction is to indicate to switch to the third state; and
wherein the operation method further comprises, in response to the second sub-switching instruction from the processor, switching the switching circuit from the second state to the third state.

14. The operation method according to claim 11, further comprising, in response to a resume instruction from the processor, switching the switching circuit from the second state or the third state to the first state.

15. The operation method according to claim 11, the in response to the switching instruction, switching the switching circuit from the first state to the third state comprises, in response to the switching instruction from the processor, switching the third port from being coupled with the first port to being coupled with the second port, wherein the external interface is coupled to an external terminal.

16. A system comprising:
a mobile device comprising:
a first memory;
a processor coupled to the first memory;
a memory system;
an external interface; and
a switching circuit comprising:
a first port coupled to the first memory;
a second port coupled to the memory system; and
a third port coupled to the external interface, and
wherein the switching circuit is configured to:
in response to a switching instruction, switch from a first state to a second state or a third state, wherein the switching instruction indicates to the switching circuit to access the memory system, wherein the switching instruction comprises a first sub-switching instruction, and the first sub-switching instruction is to indicate to switch to the second state; and
in response to the first sub-switching instruction from the processor, switch the first port from being coupled with the third port to being coupled with the second port, and wherein:
in the first state, the first memory is coupled to the external interface via the switching circuit;
in the second state, the memory system is coupled to the first memory via the switching circuit; and
in the third state, the memory system is coupled to the external interface via the switching circuit; and
an external terminal coupled to the mobile device and configured to:
access the first memory when the switching circuit is in the first state; or
access the memory system when the switching circuit is in the third state.

17. The system according to claim 16, wherein the external terminal comprises a desktop computer or a notebook computer.

18. The system according to claim 16, wherein the processor is configured to:
back up data stored in the first memory into a second memory of the memory system; or
read data stored in the second memory of the memory system.

19. The system according to claim 16, wherein the switching instruction further comprises a second sub-switching instruction, the second sub-switching instruction is to indicate to switch to the third state; and
the switching circuit is further configured to, in response to the second sub-switching instruction from the processor, switch from the second state to the third state.

20. The system according to claim 16, wherein the switching circuit is further configured to, in response to a resume instruction from the processor, switch from the second state or the third state to the first state.

\* \* \* \* \*